United States Patent [19]
Kleiner et al.

[11] Patent Number: 5,900,469
[45] Date of Patent: May 4, 1999

[54] STORAGE-STABLE, PHOSPHORUS-MODIFIED EPOXY RESINS

[75] Inventors: Hans-Jerg Kleiner, Kronberg; Sebastian Hörold, Erftstadt; Guido Scholz, Burgkirchen, all of Germany

[73] Assignee: Aventis Research & Technologies GmbH, Frankfurt am Main, Germany

[21] Appl. No.: 08/812,421

[22] Filed: Mar. 6, 1997

[30] Foreign Application Priority Data

Mar. 6, 1996 [DE] Germany .......................... 196 08 613

[51] Int. Cl.$^6$ .......................... C08G 59/30; C08G 59/14; C08G 59/40
[52] U.S. Cl. .......................... 525/507; 525/523; 525/525; 528/89; 528/108; 528/398; 528/400
[58] Field of Search ..................... 525/507, 523, 525/525; 528/108, 89, 398, 400

[56] References Cited

U.S. PATENT DOCUMENTS

| | | | |
|---|---|---|---|
| 3,454,683 | 7/1969 | Kampe et al. | 260/988 |
| 5,587,243 | 12/1996 | Von Gentzkow et al. | 428/413 |

FOREIGN PATENT DOCUMENTS

| | | |
|---|---|---|
| 2158361 | 9/1994 | Canada . |
| 409308 | 1/1991 | European Pat. Off. . |
| 384939 | 6/1994 | European Pat. Off. . |
| 2757733 | 7/1978 | Germany . |
| 4308185 | 9/1994 | Germany . |
| 4427456 | 2/1996 | Germany . |
| 94/21704 | 9/1994 | WIPO . |
| 96/04327 | 2/1996 | WIPO . |

*Primary Examiner*—Frederick Krass

[57] ABSTRACT

The present invention relates to a storage-stable, phosphorus-modified epoxy resin having an epoxide value of 0.05 to 0.6 mol/100 g and comprising 5 to 25% by weight of an ester-anhydride formed from a phosphonic acid diester, phosphinic acid ester or mixture of these esters and phosphorus pentoxide, and to a process for its preparation by reaction of 95 to 75 parts by weight of an epoxy resin (A) having an epoxide value of 0.1 to 0.8 mol/100 g and 5 to 25 parts by weight of the ester-anhydride in the presence or absence of a solvent at −20 to 150° C.

29 Claims, No Drawings

STORAGE-STABLE, PHOSPHORUS-MODIFIED EPOXY RESINS

The present invention relates to novel phosphorus-modified epoxy resins of good storage stability and a process for their preparation. The novel phosphorus-modified epoxy resins are distinguished by flame retardant properties and are of particular interest as flame retardant components in the preparation of synthetic resins having flame resistant properties.

Phosphorus-modified epoxy resins based on reaction products of polyepoxide compounds with anhydrides of phosphonic and phosphinic acids have already been described (PCT/EP 94/00748 and PCT/EP 95/02965). They have particularly good flame resistant properties and can be used as reactive epoxy resins in the production of shaped articles, prepregs, coatings and laminates (composite materials), in particular for insulating purposes in electrical engineering. A disadvantage is that the anhydrides of phosphonic and phosphinic acids require a relatively high expenditure for their preparation.

The esters of phosphonic and phosphinic acids which have been recommended as curing agents, in combination with certain zinc salts, for epoxy resins are more easily accessible industrially than the anhydrides of phosphonic and phosphinic acids (U.S. Pat. No. 33 64 159).

European Patent 0 409 308 relates to a curable epoxy resin composition which comprises a curable epoxy resin and a curing agent in an amount effective for curing, the curing agent used being a polyphosphoric acid/polyphosphonic acid ester-anhydride which is obtainable by reaction of phosphorus pentoxide with a phosphonic acid ester (phosphonate) or phosphoric acid ester (phosphate). As is known, the polyphosphoric acid/polyphosphonic acid ester-anhydrides are curing agents which are suitable for curing epoxide compounds and not only act as a pure catalyst for the curing but also react with the epoxide. A completely cured, solid resin with flame resistant properties is formed as the end product. A disadvantage is that the product is limited from the beginning to the completely cured resin obtained as the end product, the properties of which can no longer be modified, for example by reaction with other components.

In view of the importance of epoxy resins, there is generally a demand for epoxy resins having flame retardant properties which on the one hand are easily accessible and on the other hand can be further processed without problems.

This object is achieved by an epoxy resin having an epoxide value of 0.05 to 0.6 mol/100 g, comprising 5 to 25% by weight of an ester-anhydride formed from a phosphonic acid diester, phosphinic acid ester or mixture of these esters and phosphorus pentoxide.

The epoxy resin according to the invention is distinguished by a number of advantageous properties.

Firstly, it is reactive, i.e. it contains reactive groups which impart to it the ability to be employed like a reactive resin.

Secondly, it has flame regardant properties which are based on the content of ester-anhydrides which are formed by reaction of a phosphonic acid diester, phosphinic acid ester or mixture of these esters with phosphorus pentoxide and are contained in the epoxide in chemically bonded form.

Thirdly, it is easily accessible, since the ester-anhydride is based on phosphorus compounds which are available in industrial quantities and are also of interest from the economic aspect on the basis of a favorable price.

Fourthly, the epoxy resin according to the invention is storage-stable. The term storage-stable is understood as meaning that the epoxy resin retains its properties, in particular its reactivity, even during a relatively long storage time, and does not cure completely by itself.

This is to be regarded as surprising, since the epoxy resin is obtainable by reaction of an epoxy resin used as the starting material (called epoxy resin (A) below) with an ester-anhydride acting as a hardener, which is formed by reaction of a phosphonic acid diester, phosphinic acid ester or mixture of these esters and phosphorus pentoxide, and in spite of this reaction with the ester-anhydride acting as a hardener has an adequate reactivity for subsequent reactions. The epoxide value, which decreases only slightly even after storage for several weeks, can be used as a measure of the storage stability. The smaller the decrease in the epoxide value, the higher the storage stability of the phosphorus-modified epoxide in question.

The reactivity is manifested by the epoxide value. It also depends, inter alia, on the reactivity of the epoxy resin (A) employed as the starting material. The higher the epoxide value of the epoxy resin (A) employed as the starting material, the higher also the epoxide value of the phosphorus-modified epoxy resin according to the invention.

The epoxide value of the phosphorus-modified epoxy resin according to the invention is always below the epoxide value of epoxy resin (A). This is due on the one hand to the weight content of the ester-anhydride, and on the other hand to the reaction of the epoxy resin (A) with the ester-anhydride. Immediately after preparation, it is usually at least 10 to at least 30% below the epoxide value of the epoxy resin (A) employed as the starting material, where these values should be regarded as a reference and should serve as an aid to orientation.

Fifthly: on the basis of its reactivity, the flame resistant, phosphorus-modified epoxy resin can be further processed in the same way as a customary epoxy resin which is not phosphorus-modified, and reacted with other components, for example certain amines or alcohols. The flame retardant properties of the epoxy resin can advantageously be introduced into a large number of resins or laminates in this manner.

The use of the phosphorus-modified epoxy resins according to the invention as a constituent of an intumescence coating composition is the subject matter of a German patent application (file number 196 08 611.6) filed on the same day as the present application. The epoxide content present in the epoxy resin is expressed as the epoxide value in moles of epoxide per 100 g of epoxy resin. The epoxide value is determined by reaction of the epoxy resin with a tetrabutylammonium halide, for example tetrabutylammonium bromide, in glacial acetic acid and subsequent titration of the tetrabutylammonium hydroxide, formed as a result of the ring opening of the epoxide, with $HClO_4$ in accordance with the determination method according to DIN 53188.

As already mentioned above, the epoxide value of the epoxy resin is 0.05 to 0.6, in particular 0.1 to 0.4, preferably 0.2 to 0.35 mol/100 g.

As already mentioned above, the phosphorus-modified epoxy resin according to the invention is distinguished in particular by a good storage stability.

The storage stability, expressed by the change in the epoxide value after 96 hours at room temperature and a relative atmospheric humidity of not more than 50%, as a rule does not fall below the value of 90%, and preferably varies in the range from about 95% to 100%, based on the starting value of 100%.

As already mentioned above, the epoxy resin comprises 5 to 25, in particular 10 to 20, preferably 12 to 18% by weight of ester-anhydride formed by reaction of a phosphonic acid diester, phosphinic acid ester or mixture of these esters with phosphorus pentoxide. Mixtures of these esters can comprise the phosphonic acid diester and phosphinic acid ester in any desired ratios. A phosphonic acid diester-:phosphinic acid ester ratio of 1:20 to 20:1, in particular 1:10 to 10:1, preferably 1:5 to 5:1, is usually used. However, mixtures with a higher or lower ratio of phosphonic acid diester:phosphinic acid ester can also be employed.

The ester-anhydride is usually formed from 1 to 3, in particular 1.1 to 2 mol of phosphonic acid diester, phosphinic acid ester or mixtures of these esters and 1 mol of phosphorus pentoxide. However, ester-anhydrides with a higher ester content or lower ester content, in each case based on the phosphorus pentoxide, can also be used.

An ester-anhydride which is formed from a phosphonic acid diester or phosphinic acid ester and phosphorus pentoxide is of particular interest.

Phosphonic acid diesters are understood as meaning compounds of the formula (I)

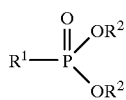

(I)

in which $R^1$ is an alkyl radical having 1 to 8 carbon atoms, a substituted or unsubstituted phenyl radical or a substituted or unsubstituted benzyl radical, in particular an alkyl radical having 1 to 3 carbon atoms or an unsubstituted phenyl or benzyl radical, and $R^2$ is an alkyl radical having 1 to 4, in particular 1 or 2, carbon atoms.

Phosphinic acid esters are understood as meaning compounds of the formula (II)

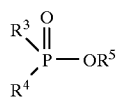

(II)

in which $R^3$ and $R^4$ are identical or different and are an alkyl radical having 1 to 8 carbon atoms, a substituted or unsubstituted phenyl radical or a substituted or unsubstituted benzyl radical, in particular an alkyl radical having 1 to 3 carbon atoms or an unsubstituted phenyl or benzyl radical, and $R^5$ is an alkyl radical having 1 to 6, in particular 1 to 4, carbon atoms.

The phosphorus-modified epoxy resin according to the invention in general has a phosphorus content of 0.5 to 8.5, in particular 1 to 5, preferably 2 to 4% by weight, based on the epoxy resin. However, the phosphorus content depends not only on the amount of ester-anhydride contained in the epoxy resin, but also on the composition of the ester-anhydride, i.e. the ratio (phosphonic acid diester, phosphinic acid ester or mixture of these esters): phosphorus pentoxide. In addition, the nature of the epoxy resin used as a starting material (called epoxy resin (A) below) and the reactivity thereof also play a role.

The phosphorus-modified epoxy resin according to the invention is reactive, as demonstrated by the epoxide value, and contains on average at least 1, in particular 1 to 3, epoxide groups per molecule, and the average functionality is accordingly (on average) at least 1, in particular 1 to 3. In this connection, it should be pointed out that the epoxide value stated in moles of epoxide/100 g of epoxy resin is likewise a mean which can assume values which deviate upward and downward, based on the individual molecule.

The phosphorus-modified epoxy resins according to the invention in general have an average molecular weight $\overline{M}_n$ (number-average, determined by gel chromatography, polystyrene standard) of up to 10 000, in particular 200 to 5000, preferably 400 to 2000.

Before the process for the preparation of the phosphorus-modified epoxy resin according to the invention is dealt with in more detail, it should be pointed out that the phosphorus-modified epoxy resin according to the invention having an epoxide value of 0.05 to 0.6 mol/100 g is obtainable by reaction of 95 to 75 parts by weight of an epoxy resin (A) having an epoxide value of 0.1 to 0.8 mol/100 g and 5 to 25 parts by weight of an ester-anhydride, formed by reaction of a phosphonic acid diester, phosphinic acid ester or mixture of these esters with phosphorus pentoxide, in the presence or absence of a solvent at 20 to 150° C.

The phosphorus-modified epoxy resin according to the invention is obtainable in particular by reaction of 95 to 75 parts by weight of a polyglycidyl ether based on bisphenol A or of a novolak as epoxy resin (A) and 5 to 25 parts by weight of the ester-anhydride.

As already indicated above, the present invention also relates to a process for the preparation of the epoxy resin according to the invention. The process comprises reacting 95 to 75 parts by weight of an epoxy resin (A) having an epoxide value of 0.1 to 0.8 mol/100 g and 5 to 25 parts by weight of ester-anhydride in the presence or absence of a solvent at -20 to 150° C.

In a number of cases, 90 to 80 parts by weight of epoxy resin (A) and 10 to 20 parts by weight of ester-anhydride can be reacted with good success.

As already explained above, ester-anhydride is understood as meaning the product formed by reaction of a phosphonic acid diester, phosphinic acid ester or mixture of these esters with phosphorus pentoxide.

The average molecular weight $\overline{M}_n$ (number-average; likewise determined by means of gel chromatography; polystyrene standard) of the epoxy resin (A) used as the starting material for the preparation of the phosphorus-modified epoxy resin according to the invention is in general up to 9000, and is usually between 150 and 9000, preferably between 150 and 4000, in particular between 300 and 1800. It is preferably derived from polyepoxide compounds having on average 2 to 6 epoxide groups per molecule (a functionality of 2 to 6). These polyepoxide compounds are preferably polyglycidyl ethers based on aromatic amines, polyhydric phenols, hydrogenation products of these phenols, and/or novolaks, in particular based on bisphenol A or a novolak.

The epoxy resin (A) (polyepoxide compound) which is employed according to the invention as the starting material, and is preferably not halogen-modified, can be saturated or unsaturated and aliphatic, cycloaliphatic, aromatic and/or heterocyclic. It can furthermore contain those substituents which do not cause troublesome side reactions under the mixing or reaction conditions, for example alkyl or aryl substituents, ether groupings or the like. Mixtures of different polyepoxide compounds can also be used.

Epoxy resin (A) (polyepoxide compound) preferably has the formula (III)

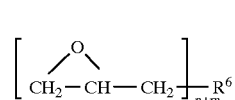

(III)

in which $R^6$ is the radical of a polyepoxide compound reduced by the glycidyl group, n=an integer from 1 to 5, preferably 1 to 3, and m=an integer from 1 to 5, preferably 1 to 3, where the sum n+m should be an integer from 2 to 6, preferably 2 to 4.

The radical $R^6$ is thus the radical which remains when all the glycidyl groups present are removed from the polyepoxide compound.

substituted by preferably 1 to 3 alkyl radicals having 1 to 6 carbon atoms, or such as phenylalkyl having 1 to 6 carbon atoms in the alkyl radical, for example benzyl.

$R^6$ is preferably the corresponding radical of a bisphenol A diglycidyl ether, a bisphenol F diglycidyl ether, or of oligomers thereof, a polyglycidyl ether of a phenol/formaldehyde or cresol/formaldehyde novolak, a diglycidyl ester of tetrahydrophthalic, phthalic, isophthalic or terephthalic acid and mixtures of these radicals.

Some of these radicals $R^6$ are represented by their formulae below:

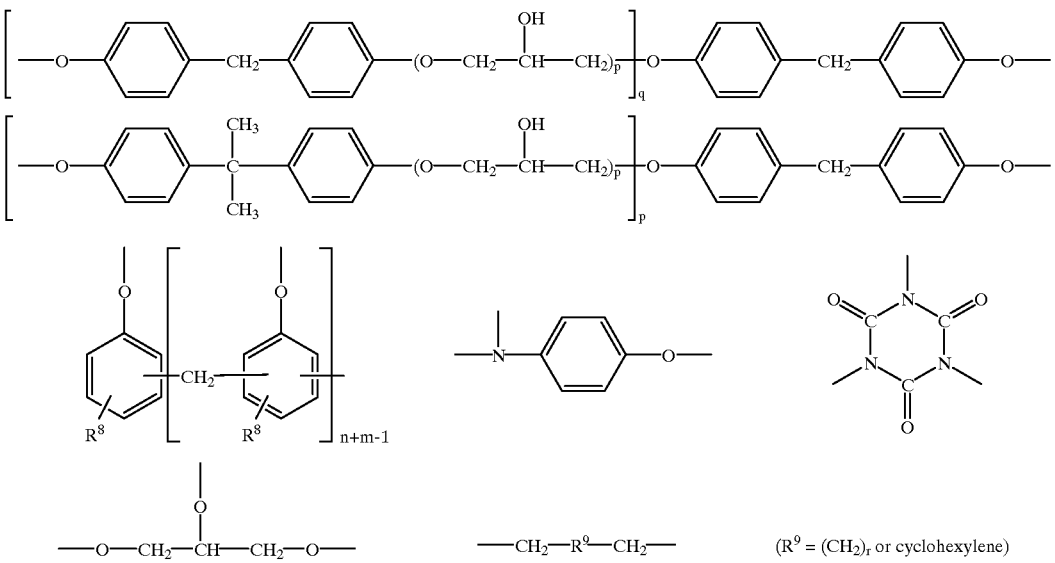

For example, $R^6$ is the (n+m)-valent radical, reduced by the glycidyl groups, of a polyether, a polyether-polyol, a polyester or a polyester-polyol;

a hydrocarbon radical, which can have a saturated or unsaturated aliphatic character and/or aromatic character and can be interrupted by heteroatoms, such as oxygen and nitrogen, and by heteroatom groups, such as —NR$^7$CO— (the meaning of $R^7$ is given below) and/or can contain these, this hydrocarbon radical, which as a rule contains at least 6, preferably at least 12 to 30, carbon atoms, preferably containing aryl groups, in particular phenyl groups, which can be substituted but are preferably unsubstituted; and a reaction product of an epoxide compound with polyamines, polyols, polycaprolactone-polyols, polyesters containing OH groups, polyethers, polyglycols, hydroxyl-, carboxyl- and amino-functional polymer oils, polycarboxylic acids or hydroxyl- or amino-functional polytetrahydrofurans.

$R^6$ can also be various of these radicals.

$^7$ is a hydrocarbon radical having 1 to 20 carbon atoms, preferably 1 to 10 carbon atoms, which can have an aliphatic and/or aromatic character and can be interrupted by heteroatoms or heteroatom groups, preferably a saturated or unsaturated, straight-chain or branched aliphatic radical, such as alkyl, alkenyl or cycloalkyl preferably having 1 to 8 carbon atoms, in particular 1 to 6 carbon atoms, such as methyl, ethyl, n- and i-propyl, n-, i- and tert-butyl and the various pentyls and hexyls, or an aryl or an aralkyl radical, such as phenyl or naphthyl which are unsubstituted or in which $R^8$ is hydrogen and/or a $C_1$–$C_{10}$-alkyl radical and the indices n and m have the meaning according to the above formula (III), the index p is 0 or 1, the index q is an integer from 0 to 40, preferably 0 to 10, and the index r is an integer from 4 to 8.

Without making claim to completeness, epoxy resins (A) (polyepoxide compounds) are, for example, polyglycidyl ethers based on polyhydric, preferably dihydric, alcohols, phenols, hydrogenation products of these phenols and/or novolaks (reaction products of mono- or polyhydric phenols, such as phenol and/or cresols, with aldehydes, in particular formaldehyde, in the presence of acid catalysts), which are obtained in a known manner, for example by reaction of particular polyols with epichlorohydrin.

Examples of polyhydric phenols which may be mentioned here are: resorcinol, hydroquinone, 2,2-bis-(4-hydroxyphenyl)-propane (bisphenol A), isomer mixtures of dihydroxydiphenylmethane (bisphenol F), 4,4'-dihydroxydiphenylcyclohexane, 4,4'-dihydroxy-3,3'-dimethyidiphenylpropane, 4,4'-dihydroxydiphenyl, 4,4'-dihydroxybenzophenone, Bis-(4-hydroxyphenyl)-1,1-ethane, bis-(4-hydroxyphenyl)-1,1'-isobutane, bis-(4-hydroxy-tert.-butylphenyl)-2,2-propane, bis-(2-hydroxynaphthyl)-methane, 1,5-dihydroxynaphthalene, tris-(4-hydroxyphenyl)-methane and bis-(4-hydroxyphenyl)-1,1'-ether, bisphenol A and bisphenol F being preferred here.

The polyglycidyl ethers of polyhydric aliphatic alcohols are also suitable as epoxy resin (A) (polyepoxide compound). Examples of such polyhydric alcohols which may be mentioned are 1,4-butanediol, 1,6-hexanediol, polyalkylene glycols, glycerol, trimethylol propane, bi s-(4-hydroxycyclohexyl )-2,2-propane and pentaerythritol.

Further possible epoxy resins (A) (polyepoxide compounds) are also (poly)glycidyl esters, which are obtained by reaction of epichlorohydrin or similar epoxide compounds with an aliphatic, cycloaliphatic or aromatic polycarboxylic acid, such as oxalic acid, adipic acid, glutaric acid, phthalic, isophthalic, terephthalic, tetrahydrophthalic or hexahydrophthalic acid, 2,6-naphthalenedicarboxylic acid and dimerized fatty acids. Examples of these are diglycidyl terephthalate and diglycidyl hexahydrophthalate.

Polyepoxide compounds which contain the epoxide groups in random distribution over the molecular chain and can be prepared by emulsions copolymerization using olefinically unsaturated compounds containing these epoxide groups, such as, for example, glycidyl esters of acrylic or methacrylic acid, can in some cases advantageously be employed as epoxy resin (A).

Further epoxy resins (A) (polyepoxide compounds) which can be used are, for example, those based on heterocyclic ring systems, such as, for example, hydantoin epoxy resins, triglycidyl isocyanurate and/or oligomers thereof, triglycidyl-p-aminophenol, triglycidyl-p-aminodiphenyl ether, tetraglycidyidiaminodiphenylmethane, tetraglycidyl-diaminodiphenyl ether, tetrakis-(4-glycidoxyphenyl)-ethane, urazole epoxides, uracil epoxides and oxazolidinone-modified epoxy resins; and furthermore polyepoxides based on aromatic amines, such as aniline, for example N,N-diglycidylaniline, diaminodiphenylmethane and N,N'-dimethylaminodiphenylmethane or -sulfone. Other suitable polyepoxide compounds are described in "Handbook of Epoxy Resins" by Henry Lee and Kris Neville, McGraw-Hill Book Company, 1967, in the monograph by Henry Lee "Epoxy Resins", American Chemical Society, 1970, in Wagner/Sarx, "Lackkunstharze" [Synthetic Paint Resins], Carl HanserVerlag (1971), page 174 et seq., in "Angew. Makromol. Chemie", Volume 44 (1975), pages 151 to 163, in DE Offenlegungsschrift 2 757 733 and in EP Laid-Open Specification 0 384 939, to which reference is made here.

Epoxy resins (A) (polyepoxide compounds ) which are preferably employed are bisglycidyl ethers based on bisphenol A, bisphenol F and bisphenol S (reaction products of these bisphenols and epichloro(halogeno)hydrin or oligomers thereof, polyglycidyl ethers of phenol/formaldehyde and/or cresol/formaldehyde novolaks and diglycidyl esters of phthalic, isophthalic, terephthalic, tetrahydrophthalic and/or hexahydrophthalic acid.

As already mentioned above, the epoxy resins (A) (polyepoxide compounds) used usually have an epoxide value of 0.1 to 0.8 mol of epoxide/100 g of epoxy resin (A), in particular 0.3 to 0.7, preferably 0.4 to 0.6 mol of epoxide/100 g of epoxy resin (A).

The ester-anhydride formed from a phosphonic acid diester, phosphinic acid ester or mixture of these esters and phosphorus pentoxide is usually obtained by reacting 1 to 3, in particular 1.1 to 2 mol of phosphonic acid diester of the formula (I)

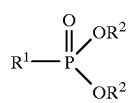

(I)

phosphinic acid ester of the formula (II)

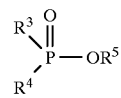

(II)

or mixture of these esters with 1 mol of phosphorus pentoxide.

The mixtures of these esters can comprise the phosphonic acid diester and phosphinic acid ester in any ratios. A phosphonic acid diester: phosphinic acid ester ratio of 1:20 to 20:1, in particular 1:10 to 10: 1, preferably 1:5 to 5:1, is usually used. However, mixtures having a higher or lower ratio of phosphonic acid diester:phosphinic acid ester can also be employed.

Without making claim to completeness, phosphonic acid diesters of the formula (I) which may be mentioned are dimethyl methanephosphonate, diethyl methanephosphonate, dimethyl ethanephosphonate, diethyl ethanephosphonate, dimethyl propanephosphonate, diethyl propanephosphonate, dimethyl benzenephosphonate and dimethyl benzylphosphonate, and phosphinic acid esters of the formula (II) which may be mentioned are methyl dimethylphosphinate, methyl ethyl-methylphosphinate, ethyl ethyl-methylphosphinate, isobutyl ethyl-methylphosphinate, amyl ethyl-methylphosphinate, methyl methyl-propylphosphinate, ethyl methyl-propylphosphinate, methyl methyl-phenylphosphinate, ethyl methyl-phenylphosphinate, isopropyl benzyl-methylphosphinate, methyl diphenylphosphinate, ethyl diphenylphosphinate and n-butyl benzyl-phenylphosphinate.

The reaction can be carried out in the presence or absence of a solvent which is inert under the reaction conditions. It has proved appropriate to use a solvent in many cases.

The preparation of the ester-anhydrides is described, for example, in U.S. Pat. No. 34 54 683 and U.S. Pat. No. 34 54 684.

In the simplest case, the phosphonic acid diester, phosphinic acid ester or mixture of these esters is initially introduced into the reaction vessel, the phosphorus pentoxide is added in portions and the mixture is heated, for example to 100 to 150° C. The mixture is usually stirred to give a clear reaction mixture. However, ester-anhydrides having a higher ester content or lower ester content, in each case based on the phosphorus pentoxide, can also be prepared by reacting larger or smaller amounts of phosphonic acid diesters, phosphinic acid esters or mixtures of these esters than that stated above with 1 mol of phosphorus pentoxide.

During the reaction, the phosphonic acid diester, phosphinic acid ester or mixture of these esters reacts with the phosphorus pentoxide and the corresponding ester-anhydride is formed. This reaction usually proceeds to completion, so that the ester-anhydride comprises no amounts or only low to very low amounts of the starting substances. The ester-anhydride thus comprises units which are based on the phosphonic acid diester, the phosphinic acid ester or the mixture of these esters and on phosphorus pentoxide, and is a polyphosphonic acid and/or polyphosphinic acid/polyphosphoric acid ester-anhydride.

A phosphonic acid diester of the formula (I)

(I)

in which $R^1$ is an alkyl radical having 1 to 8, in particular 1 to 4, preferably 1 to 3, carbon atoms, phenyl or benzyl and $R^2$ is an alkyl radical having 1 to 4, in particular 1 to 3, preferably 1 or 2, carbon atoms, and/or a phosphinic acid ester of the formula (II)

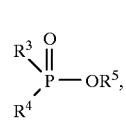
(II)

in which $R^3$ and $R^4$ are identical or different and independently of one another are an alkyl radical having 1 to 8 carbon atoms, phenyl or benzyl, in particular an alkyl radical having 1 to 8, preferably 1 to 4, in particular 1 to 3, carbon atoms, can be employed with good success in the process for the preparation of the ester-anhydride.

The preparation of the ester-anhydride can be carried out without addition of a solvent. However, it is also possible to carry out the preparation in the presence of a solvent.

The solvent employed in the preparation of the ester-anhydride is a polar aprotic solvent, an aprotic non-polar solvent or a mixture of these solvents, in particular a polar aprotic solvent or a mixture of these solvents.

It is possible to employ as the solvent, for example, an aliphatic or cycloaliphatic ether having 4 to 12 carbon atoms, an alkylene glycol monoalkyl or dialkyl ether having 2 to 20 carbon atoms in the alkylene radical and 1 to 6 carbon atoms in the alkyl radical, an aliphatic or cycloaliphatic ketone having 3 to 6 carbon atoms, an aliphatic or cycloaliphatic hydrocarbon having 6 to 20 carbon atoms, an aromatic hydrocarbon having 6 to 20 carbon atoms, a dialkylamide of an aliphatic carboxylic acid having 3 to 12 carbon atoms, N-methylpyrrolidone or a mixture of these solvents.

Without making claim to completeness, examples which may be mentioned of suitable solvents are the solvents listed below: N-methylpyrrolidone and dimethylformamide; ethers, such as diethyl ether, tetrahydrofuran, dioxane and ethylene glycol mono- and diethers, propylene glycol mono- and diethers and butylene glycol mono- and diethers of monoalcohols with an optionally branched alkyl radical of 1 to 6 carbon atoms; ketones, such as, for example, acetone, methyl ethyl ketone, methyl isopropyl ketone, methyl isobutyl ketone, cyclohexanone and the like; esters, such as ethyl acetate, butyl acetate, ethylglycol acetate and methoxypropyl acetate; and halogenated hydrocarbons (cyclo)aliphatic and/or aromatic hydrocarbons, such as hexane, heptane, cyclohexane, toluene, the various xylenes and aromatic solvents in the boiling range from about 150 to 180° C. (higher-boiling mineral oil fractions, such as ®Solvesso). These solvents can be employed individually or as a mixture.

It depends on the individual case whether the preparation of the phosphorus-modified epoxy resin according to the invention is carried out in the presence or absence of a solvent. The presence of a solvent has the advantage that the phosphorus-modified epoxy resin is obtained in solution and this solution can usually be handled easily for further treatment or further processing. In particular, addition of a solvent proves to be beneficial in the case of phosphorus-modified epoxy resins of relatively high viscosity.

The preparation of the phosphorus-modified epoxy resin requires no particular technical expenditure. Epoxy resin (A) (polyepoxide compound), the ester-anhydride and, if appropriate, the solvent are brought together in the desired ratios of amounts, thorough mixing is ensured and the reaction of epoxy resin (A) with the ester-anhydride is carried out, if appropriate with heating. In a number of cases, the reaction proceeds by itself with gentle evolution of heat. However, it is also possible to promote and to accelerate the reaction by supplying heat.

As already mentioned above, the reaction can be carried out at −20 to 150° C. In a large number of cases, it has proved favorable to react the epoxy resin (A) (polyepoxide compound) and the ester-anhydride at 40 to 130, in particular 60 to 110° C.

When the reaction has taken place, the reaction mixture is allowed to cool. If desired, any solvent or solvent mixture present can be separated off from the phosphorus-modified epoxy resin, for example by distillation.

However, it is also possible to omit removal of the solvent or solvent mixture and both to store and to further process the phosphorus-modified epoxy resin in the form of a solution.

The reaction of epoxy resin (A) with the ester-anhydride leads to the formation of the phosphorus-modified epoxy resin according to the invention, the ester-anhydride originally employed usually reacting completely or virtually completely with epoxy resin (A) and being contained in the phosphorus-modified epoxy resin in chemically bonded form. Free, unreacted ester-anhydride is not present or is present only in low to very low amounts in the phosphorus-modified epoxy resin.

The flame retardant properties of the phosphorus-modified epoxy resin are based on the phosphorus content incorporated via the ester-anhydride.

The phosphorus-modified epoxy resin is non-crosslinked or essentially non-crosslinked. This means that its gel content, which is a measure of the crosslinking, is usually 0 to 10, in particular 0 to 5, preferably 0 to 2, particularly preferably 0 to 1% by weight. The phosphorus-modified epoxy resin is therefore soluble in organic solvents and can usually be readily dissolved, for example, in an ester or ketone. Examples of esters which may be mentioned are esters of aliphatic carboxylic acids having 1 to 8 and aliphatic alcohols having 1 to 6 carbon atoms, such as methyl acetate, ethyl acetate, propyl acetate, butyl acetate and the methyl, ethyl and propyl esters of propionic acid, butyric acid and isobutyric acid, and examples of ketones which may be mentioned are aliphatic ketones having a total of 3 to 12 carbon atoms, such as acetone, methyl ethyl ketone, diethyl ketone, methyl butyl ketone, methyl isobutyl ketone, cyclopentanone and cyclohexanone.

The phosphorus-modified epoxy resin comprises, demonstrated by its epoxide value, reactive groups and is accordingly reactive in the same way as a customary epoxy resin which is not phosphorus-modified. It retains its reactivity in virtually unchanged form or at most in a slightly reduced form even during storage, for example over several weeks. The decrease in the epoxide value caused by the storage, which is low to very low, is to be regarded as an indication of this.

The phosphorus-modified epoxy resin according to the invention has a lower epoxide value than the epoxy resin (A) employed as the starting material. An epoxide value of 25 to 80, in particular 35 to 70, preferably 40 to 60% of the epoxide value of epoxy resin (A) serves as a reference for this. However, it should be expressly pointed out that this is only a recommended value for a large number of cases and does not exclude an epoxy resin according to the invention having a higher or lower epoxide value.

The following examples describe the invention without limiting it.

EXPERIMENTAL SECTION

Example 1 a) Preparation of the ester-anhydride

A total of 35.5 g (0.25 mol) of phosphorus pentoxide is added in portions to 76 g (0.5 mol) of dimethyl propanephosphonate under a nitrogen atmosphere, while stirring. During this addition, the temperature rises to 100° C. The mixture is then heated to 150° C. to give the ester-anhydride as a clear reaction mixture. The mixture is allowed to cool and a 50% strength by weight solution is prepared by addition of 111.5 g of ethyl acetate to the cooled ester-anhydride.

b) Preparation of the phosphorus-modified epoxy resin 943.4 g of a solution of 754.72 g of an epoxidized novolak having an epoxide value of 0.7 mol/100 and 188.68 g of methyl ethyl ketone are initially introduced into a reaction vessel under a nitrogen atmosphere (epoxide value 0.56 mol/100 g of solution), and 211.8 g of the ester-anhydride solution prepared according to Example 1 a) are added dropwise in the course of one hour, while stirring. During this addition, the temperature rises to 45° C. The reaction mixture is then boiled under reflux for 11 hours.

After cooling, a phosphorus-modified epoxy resin having an epoxide value of 0.27 mol/100 g of solution (corresponding to 0.36 mol/100 g of phosphorus-modified epoxy resin, solvent-free) is obtained.

After storage at room temperature for four weeks, the epoxide value is unchanged at 0.27 mol/100 g of solution.

Example 2 a) Preparation of the ester-anhydride

A total of 35.5 g (0.25 mol) of phosphorus pentoxide is added over a short period of time in portions to 62 9 (0.5 mol) of dimethyl methanephosphonate under a nitrogen atmosphere, while stirring. During this addition, the temperature rises to 100° C. The mixture is then heated to 140° C. to give the ester-anhydride as a clear reaction mixture. The mixture is allowed to cool and a 50% strength by weight solution is prepared by addition of 97.5 g of ethyl acetate.

b) Preparation of the phosphorus-modified epoxy resin 943.4 g of a solution of 754.72 g of an epoxidized novolak having an epoxide value of 0.7 mol/100 g and 188.68 g of methyl ethyl ketone are initially introduced into a reaction vessel (epoxide value 0.56 mol/100 g of solution), and 180.2 g of the ester-anhydride solution prepared according to Example 2 a) are added dropwise in the course of one hour, while stirring. During this addition, the temperature rises to 45° C. The reaction mixture is then boiled under reflux for 11 hours.

After cooling, a phosphorus-modified epoxy resin having an epoxide value of 0.27 mol/100 g of solution (corresponding to 0.36 mol100 g of phosphorus-modified epoxy resin, solvent-free) is obtained.

After storage at room temperature for four weeks, the epoxide value is 0.26 mol/100 of solution.

Example 3 a) Preparation of the ester-anhydride

A total of 24 g (0.169 mol) of phosphorus pentoxide is added in portions to 60 g (0.333 mol) of diethyl propanephosphonate under a nitrogen atmosphere, while stirring. During this addition, the temperature rises to 95° C. The mixture is then heated to 145° C. to give the ester-anhydride as a clear reaction mixture. The mixture is then allowed to cool. A solution comprising 53% by weight of ester-anhydride is prepared by addition of ethyl acetate.

b) Preparation of the phosphorus-modified epoxy resin 400 g of a solution of 320 g of an epoxidized novolak having an epoxide value of 0.7 mol/100 g and 80 g of methyl ethyl ketone (epoxide value of the resulting solution: 0.56 mol/100 g of solution) are initially introduced into the reaction vessel, and 98 g of the ester-anhydride solution prepared according to Example 3 a) are added dropwise in the course of 80 minutes, while stirring. During this addition, the temperature rises to 43° C. The reaction mixture is then boiled under reflux for 8 hours.

After cooling, a phosphorus-modified epoxide having an epoxide value of 0.27 mol/100 g of solution (corresponding to 0.361 mol/100 g of phosphorus-modified epoxy resin, solvent-free) is obtained.

After storage at room temperature for six months, the epoxide value is 0.26 mol/100 g of solution.

Example 4 a) Preparation of the ester-anhydride

A total of 82 g (0.58 mol) of phosphorus pentoxide is added in portions to 99.3 g (0.8 mol) of dimethyl methanephosphonate under a nitrogen atmosphere, while stirring. During this addition, the temperature rises to 115° C. The mixture is then heated to 140° C. to 150° C. to give the ester-anhydride as a clear reaction mixture. The mixture is then allowed to cool.

b) Preparation of the phosphorus-modified epoxy resin 224 g of an epoxy resin based on bisphenol A (Araldit GY 260) having an epoxide value of 0.51 to 0.54 mol/100 g are initially introduced into the reaction vessel, and a total of 40 g of the ester-anhydride prepared according to Example 4 a) is added dropwise, while stirring. During this addition, the temperature rises to 58° C., and thereafter falls. The mixture is then allowed to react at 100° C. for 3.5 hours to give, after cooling, an oil which is highly viscous at room temperature. A solution comprising 75% by weight of the phosphorus-modified epoxy resin, the epoxide value of which is 0.21 mol/100 g of solution, is prepared by addition of ethyl acetate.

Example 5 a) Preparation of the ester-anhydride

A total of 99.4 g (0.7 mol) of phosphorus pentoxide is added in portions to 99.3 g (0.8 mol) of dimethyl methanephosphonate under a nitrogen atmosphere, while stirring. During this addition, the temperature rises to 80° C. The mixture is then heated to 90° C. to give the ester-anhydride as a clear reaction mixture. The mixture is then allowed to cool.

b) Preparation of the phosphorus-modified epoxy resin 100 g of a bisphenol A bisglycidyl ether (Beckopox® EP, 140) having an epoxide value of 0.55 mol/100 g are dissolved in 50 ml of methylene chloride. 12.5 g of the ester-anhydride prepared according to Example 5 a) are then dissolved in 40 ml of methylene chloride and this solution is added dropwise to the solution of the bisphenol A bisglycidyl ether in the course of 20 minutes, while stirring. During this addition, the temperature rises to 40° C.

The mixture is then heated, the methylene chloride is distilled off at a bath temperature of 65° C. and the reaction mixture is subsequently stirred at a bath temperature of 100° C. for 2 hours.

A clear, colorless phosphorus-modified epoxy resin which is solid at room temperature and has an epoxide value of 0.32 mol/100 g is obtained.

Example 6 a) Preparation of the ester-anhydride 14.8 g of the ester-anhydride prepared according to Example 5 a) are dissolved in 20 ml of methylene chloride.

b) Preparation of the phosphorus-modified epoxy resin 115 g of a bisphenol A bisglycidyl ether (Beckopox® EP 140) having an epoxide value of 0.55 mol/100 g are dissolved in 50 ml of methyl ethyl ketone, and this solution is initially introduced into the reaction vessel, while heating at 55° C. The entire ester-anhydride solution prepared according to Example 6 a) is then added dropwise in the course of 20 minutes, while stirring. Thereafter, the mixture is heated, methylene chloride is distilled off at a bath temperature of 80° C. and the reaction mixture is subsequently stirred at a bath temperature of 80° C. for 1 hour.

A clear, colorless solution of the phosphorus-modified epoxy resin having an epoxide value of 0.22 mol/100 of solution is obtained.

Example 7 a) Preparation of the ester-anhydride 25 g of the ester-anhydride prepared according to Example 5 a) are dissolved in 30 ml of methylene chloride.

b) Preparation of the phosphorus-modified epoxy resin 100 g of a bisphenol A bisglycidyl ether (Beckopox® EP 140) having an epoxide value of 0.55 mol/100 g are dissolved in 50 ml of methyl ethyl ketone, and this solution is initially introduced into the reaction vessel, while heating at 55° C. The entire ester-anhydride solution prepared according to Example 7 a) is then added dropwise in the course of 20 minutes, while stirring. Thereafter, the mixture is heated, methylene chloride is distilled off at a bath temperature of 80° C. and the reaction mixture is subsequently stirred at a bath temperature of 80° C. for 1 hour. A further 50 ml of methyl ethyl ketone are added to the viscous reaction mixture obtained.

192 g of a clear, colorless solution of the phosphorus-modified epoxy resin having an epoxide value of 0.1 mol/100 g of solution are obtained. After storage at room temperature for 12 days, the epoxide value of the solution is unchanged at 0.1 mol/100 g of solution.

Example 8 a) Preparation of the ester-anhydride

A total of 99.4 g (0.7 mol) of phosphorus pentoxide is added in portions to 132.8 g (0.8 mol) of diethyl ethanephosphonate under a nitrogen atmosphere, while stirring. During this addition, the temperature rises to 80° C. The mixture is then heated to 90° C. to give the ester-anhydride as a clear reaction mixture. 15.2 g of the ester-anhydride, cooled to room temperature, are dissolved in 40 ml of methylene chloride.

b) Preparation of the phosphorus-modified epoxy resin 104 g of a bisphenol A bisglycidyl ether (Beckopox® EP 140) having an epoxide value of 0.55 mol/100 g are dissolved in 50 ml of methylene chloride, and this solution is initially introduced into the reaction vessel at room temperature. The entire ester-anhydride solution prepared according to Example 8 a) is then added dropwise in the course of 20 minutes, while stirring. During this addition, the temperature rises to 33° C. Thereafter, the mixture is heated, the solvent is distilled off at a bath temperature of 100° C. and the reaction mixture is subsequently further stirred at a bath temperature of 100° C. for another 2 hours.

120 g of a clear, colorless phosphorus-modified epoxy resin which is solid at room temperature and has an epoxide value of 0.32 mol/100 g are obtained.

Example 9 a) Preparation of the ester-anhydride

A total of 28.4 g (0.2 mol) of phosphorus pentoxide is added in portions to 48.8 g (0.4 mol) of methyl ethylmethylphosphinate under a nitrogen atmosphere, while stirring. During this addition, the temperature rises to 35 to 40° C. The mixture is then heated to 135° C. and subsequently stirred at this temperature for two hours to give the ester-anhydride as a clear reaction mixture. The mixture is allowed to cool and a solution comprising 50% by weight of ester-anhydride is prepared by addition of ethyl acetate.

b) Preparation of the phosphorus-modified epoxy resin 236 g of a solution of 188.8 g of an epoxidized novolak having an epoxide value of 0.7 mol/100 g and 47.2 g of methyl ethyl ketone (epoxide value of the resulting solution 0.56 mol/100 g of solution) are initially introduced into the reaction vessel, and 44.6 g of the ester-anhydride solution prepared according to Example 9 a) are added dropwise in the course of 35 minutes, while stirring. During this addition, the temperature rises to 35° C. The reaction mixture is then boiled under reflux for 10 hours.

After cooling, a phosphorus-modified epoxy resin having an epoxide value of 0.30 mol/100 g of solution (corresponding to 0.39 mol/100 g of phosphorus-modified epoxy resin, solvent-free) is obtained.

Comparison Example according to EP 409 308 a) Preparation of the ester-anhydride

As described in Example 1 of EP 0 409 308, a total of 82 g (0.578 mol) of phosphorus pentoxide is added in portions to 99.3 g (0.8 mol) of dimethyl methanephosphonate under a nitrogen atmosphere.

22.4 g of an epoxy resin based on bisphenol A (Araldit GY 260) having an epoxide value of 0.51 to 0.54 mol/100 g are initially introduced into the reaction vessel, and a total of 20.3 g of the ester-anhydride prepared according to Comparison Example a) are added dropwise, while stirring. During this addition, the temperature rises to 150° C., and falls after a short time. Although the reaction mixture is not allowed to after-react but is allowed to cool immediately, a completely cured, rock-hard resin, the epoxide value of which is only 0.02 mol/100 g, is obtained after cooling to room temperature.

We claim:

1. A process for the preparation of a phosphorous-modified epoxy resin, which comprises reacting
   A. 95 to 75 parts by weight of an epoxy resin having a starting epoxide value of 0.1 to 0.8 mol/g and
   B. 5 to 25 parts by weight of a phosphorus-containing ester-anhydride said phosphorus ester-anhydride being the reaction product of components comprising phosphorus pentoxide and a phosphonic acid diester, phosphinic acid ester, or a mixture thereof, in the presence or absence of a solvent at −20 to 150° C., and obtaining as the product of said process a phosphorus-modified epoxy resin having, on average, an epoxide value of 0.05 to 0.6 mol/100 g.

2. The process as claimed in claim 1, wherein said phosphorous-containing ester-anhydride is the reaction product of the components comprising phosphorus pentoxide and a phosphonic acid diester or phosphinic acid ester.

3. The process as claimed in claim 2, which comprises reacting 90 to 80 parts by weight of said epoxy resin and 10 to 20 parts by weight of said phosphorus-containing ester-anhydride.

4. The process as claimed in claim 2, wherein said epoxy resin has an average molecular weight $M_n$ of 150 to 9000.

5. The process as claimed in claim 2, wherein said epoxy resin has an average molecular weight $M_n$ of 150 to 4000.

6. The process as claimed in claim 2, wherein said epoxy resin has an average molecular weight $M_n$ of 300 to 1800.

7. The process as claimed in claim 2, wherein said component A comprises a polyglycidyl ether.

8. The process as claimed in claim 2, wherein the phosphorus-containing ester-anhydride has been obtained by reacting, with each mole of phosphorus pentoxide, 1 to 3 mols of a phosphonic acid diester, a phosphinic acid ester, or a mixture thereof, in the presence of a solvent for the phosphorus-containing ester-anhydride, in which solvent the phosphorus-containing ester-anhydride is dissolved.

9. The process as claimed in claim 8, wherein the molar amount of phosphonic acid diester, phosphinic acid ester or mixture of these esters, per mol of phosphorous pentoxide is 1.1 to 2 mol.

10. The process as claimed in claim 8, wherein said solvent comprises an aprotic solvent.

11. The process as claimed in claim 8, wherein said solvent is an aliphatic or cycloaliphatic ether having 4 to 12 carbon atoms, an alkylene glycol monoalkyl or dialkyl ether having 2 to 20 carbon atoms in the alkylene radical and 1 to 6 carbon atoms in the alkyl radical, an aliphatic or cycloaliphatic ketone having 3 to 6 carbon atoms, an aliphatic or cycloaliphatic hydrocarbon having 6 to 20 carbon atoms, an aromatic hydrocarbon having 6 to 20 carbon atoms, a dialkylamide of an aliphatic carboxylic acid having 3 to 12 carbon atoms, N-methylpyrrolidone or a mixture of these solvents.

12. The process as claimed in claim 8, wherein said phosphonic acid diester comprises a compound of the formula (I)

(I)

in which $R^1$ is an alkyl radical having 1 to 8 carbon atoms, phenyl or benzyl and $R^2$ is an alkyl radical having 1 to 4 carbon atoms, and wherein said phosphinic acid ester is a compound of the formula (II):

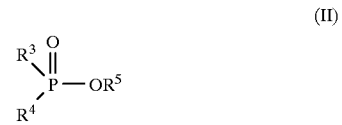

(II)

in which $R^3$ and $R^4$ are identical or different and independently of one another are an alkyl radical having 1 to 8 carbon atoms, phenyl or benzyl and $R^5$ is an alkyl radical having 1 to 6 carbon atoms.

13. The process as claimed in claim 2, wherein the epoxy resin and the phosphorus-containing ester-anhydride are reacted at 40 to 130° C.

14. The process as claimed in claim 2, wherein the epoxy resin and the phosphorus-containing ester-anhydride are reacted at 60 to 110° C.

15. A phosphorus-modified epoxy resin which is the reaction product of the components comprising:
   A. a reactive epoxide starting material, and
   B. 5 to 25% by weight, based on the weight of said components, of an ester-anhydride which is the reaction product of the components comprising phosphorus pentoxide and a phosphonic acid diester, a phosphinic acid ester, or a mixture thereof, said phosphorus-modified epoxy resin having, on average, an epoxide value of 0.05 to 0.6 mol/100 g; said reaction product being storage stable.

16. A phosphorus-modified epoxy resin as claimed in claim 15, wherein said epoxide value is, on average, 0.1 to 0.4 mol/100 g; said phosphorus-modified epoxy resin has, on average, at least one epoxide group per molecule; and said phosphorus-modified epoxy resin is essentially free of unreacted phosphorus-containing ester-anhydride.

17. A phosphorus-modified epoxy resin as claimed in claim 15, wherein said epoxide starting material has a starting material epoxide value of 0.1 to 0.8 mol/100 g.

18. A phosphorus-modified epoxy resin as claimed in claim 15, wherein the amount of said epoxide starting material is 95 to 75 parts by weight, based on the weight of said components.

19. A phosphorus-modified epoxy resin as claimed in claim 15, which is the reaction product of the components comprising:
   A. 90 to 80 parts by weight of said epoxide starting material, and
   B. 10 to 20 parts by weight of said phosphorus-containing ester-anhydride.

20. A phosphorus-modified epoxy resin as claimed in claim 16, wherein said epoxide starting material has a starting material epoxide value of 0.1 to 0.8 mol/100 g; and wherein the gel content of said phosphorus-modified epoxy resin is less than 10% by weight, said phosphorus-modified epoxy resin having essentially the same reactivity as epoxy starting material which has not been phosphorus-modified.

21. A phosphorus-modified epoxy resin as claimed in claim 20, wherein said gel content ranges from 0 to 5% by weight.

22. A phosphorus-modified epoxy resin as claimed in claim 20, wherein said epoxide value of 0.1 to 0.4 mol/100 g retains at least 90% of its initial value after storage for 96 hours at room temperature and a relative humidity of up to 50%.

23. A phosphorus-modified epoxy resin as claimed in claim 15, wherein said ester-anhydride is the reaction product of the components comprising, for each mole of phosphorus pentoxide, 1 to 3 mols of a phosphonic acid diester, a phosphinic acid ester, or a mixture thereof.

24. A phosphorus-modified epoxy resin as claimed in claim 23, wherein said amount of phosphonic acid diester, phosphinic acid ester, or mixture thereof is 1.1 to 2 mols per mole of phosphorus pentoxide, and wherein said phosphorus-modified epoxy resin is essentially free of unreacted phosphorus-containing ester-anhydride.

25. A phosphorus-modified epoxy resin as claimed in claim 15, wherein said reactive epoxide compound comprises a polyglycidyl ether having an average molecular weight, $M_n$, of 150 to 9000.

26. A phosphorus-modified epoxy resin as claimed in claim 25, wherein said polyglycidyl ether is a polyglycidyl ether of a bisphenol or a novolak.

27. A process for preparing a hardened, phosphorus-modified epoxy resin comprising the step of hardening said phosphorus-modified epoxy resin as claimed in claim 15, said phosphorus-modified epoxy resin having, immediately after preparation, an epoxide value which is about 10 to 30% below the starting epoxide value.

28. A process for reacting the phosphorus-modified epoxy resin as claimed in claim 15, comprising the step of reacting said phosphorus-modified epoxy resin with an amine or alcohol.

29. An intumescent coating composition comprising a phosphorus-modified epoxy resin as claimed in claim 15.

* * * * *